Sept. 23, 1947.    G. CAMILLI ET AL    2,427,900
TEMPERATURE MEASURING SYSTEM
Filed Dec. 22, 1945
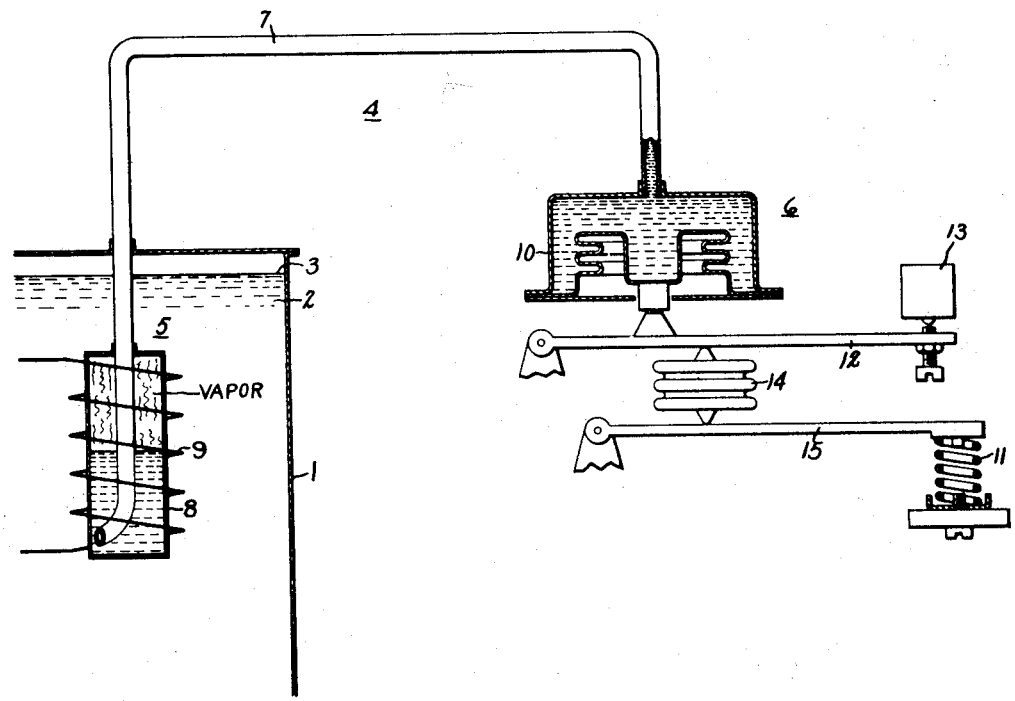
Inventors:
Guglielmo Camilli,
Jean Penvenne,
by Ernest C. Britton
Their Attorney.

Patented Sept. 23, 1947

2,427,900

UNITED STATES PATENT OFFICE 2,427,900

TEMPERATURE MEASURING SYSTEM

Guglielmo Camilli, Pittsfield, and Jean Penvenne, Lenox, Mass., assignors to General Electric Company, a corporation of New York Application December 22, 1945, Serial No. 636,658

1 Claim. (Cl. 200—140)

This invention relates to temperature measuring systems and more particularly to improvements in ambient temperature compensation of spring biased vapor pressure type hot spot temperature measuring systems for liquid-immersed stationary induction apparatus.

An oil-filled transformer is a typical stationary induction apparatus. The life of a transformer is determined by the temperature of the hottest spot in its windings and therefore it is important to measure this so-called hot spot temperature for the purpose of limiting its value, either manually in response to an alarm or visual indication of the system or automatically in response to the operation of the system. It is impractical to measure directly the hot spot winding temperature. Therefore, it is measured indirectly by a system which responds to a heater which is immersed in the same liquid as the transformer. The heater carries a current which is proportional to the transformer load current and it raises the temperature of the thermally responsive element of the system above the liquid temperature during transient overloads just as the load current raises the actual hot spot temperature above the liquid temperature during transient overloads. The thermally responding element of the system is typically a bulb, the bottom part of which is filled with a liquid, such as methyl alcohol, and the top part of which is filled with the vapor of the liquid. The vapor pressure, which is a definite function of its temperature, is transmitted hydraulically by a capillary tube to a bellows whose expansion is restricted by a biasing spring. The capillary tube is connected to the liquid in the thermal responsive element and the tube and bellows are completely filled with liquid. The system is so calibrated or set that the expanded position of the bellows is a definite indication of the hot spot temperature although the vapor temperature of the system is not necessarily the same as the actual hot spot temperature.

Such a system operates very well at any particular ambient temperature for which it is adjusted. However, unless the heater has been specially lagged or heat insulated so as to match the transient thermal characteristics of the transformer or unless the spring biased bellows has been ambient temperature compensated the system will have too high a setting as the ambient temperature decreases. In other words, during long time overloads of moderate value the heater temperature rise over the liquid will lag behind the hot spot temperature rise over the liquid as the ambient temperature goes down and thus the system will permit the attainment of too high hot spot temperatures. Heretofore, the ambient temperature compensation has been a bimetallic element which effectively decreases the biasing force of the spring as the ambient temperature drops, thus lowering the temperature setting of the system sufficiently so that the hot spot temperature will not be permitted to reach too high a value at any ambient temperature while at the same time the proper durations of a given overload at different ambient temperatures are permitted. In other words, the transformer is permitted to carry a predetermined overload for a substantially longer time at a low ambient temperature than at a high ambient temperature. Such bimetallic temperature compensators are, however, not fully satisfactory for a number of reasons. Thus, in order for them to develop the necessary forces they must be relatively large and bulky, being typically substantially larger than the bellows itself. In the second place, they are not sufficiently rigid and thus introduce an element of unreliability or uncertainty in the setting of the system.

In accordance with this invention the temperature compensator is a second liquid-filled bellows. The thermal expansion and contraction of the liquid provides the necessary operating force. The particular liquid which at present is preferred is turpentine because it is stable and liquid over a very wide temperature range. In accordance with another feature of the invention a lever system is introduced between the ambient temperature compensating bellows and the biasing spring for the main bellows in order to adapt the characteristics of the compensating bellows to the characteristics or gradient of a practical biasing spring.

An object of the invention is to provide a new and improved temperature measuring system.

Another object of the invention is to provide a new and improved ambient temperature compensator for a hot spot winding temperature measuring system.

The invention will be better understood from the following description taken in connection with the accompanying drawing and its scope will be pointed out in the appended claim.

Referring now to the drawing, which illustrates diagrammatically a preferred embodiment of the invention, there is shown therein a tank 1, such as a steel transformer tank, which is substantially filled with oil 2, the top level of which is indicated at 3. For measuring the hot spot winding temperature of the transformer (not shown) which is enclosed by the tank 1 there is provided a system which is indicated generally by the reference character 4. This consists essentially of three main parts. The first is a thermal element 5 which is inside the tank 1 and slightly below the top level 3 of the oil 2. The second element is an indicating or pressure response element 6 which is outside the tank 1. The third element is a capillary tube 7 which interconnects the elements 5 and 6.

The thermal element 5 consists of a thermal responsive device 8 and a heater 9. The device 8 is a hollow bulb which is partially filled with a liquid, such as methyl alcohol, the remaining top volume being filled with the vapor of this liquid. The heater 9, which may be a simple resistance heating wire coiled around the bulb, is adapted to be connected to a current transformer which is energized by the main transformer load current. The capillary tube 7 is connected to the thermal response member in such a way that it has an open end below the liquid level in the bulb and the tube 7 is entirely filled with the liquid so that the vapor pressure in the bulb is transmitted hydraulically through the liquid which fills the tube 7. This pressure is transmitted to the part 6 which consists essentially of a main liquid-filled bellows 10, the expansion of which is restrained by a biasing spring 11. The expansion and contraction of the bellows 10 actuates a pivoted arm 12, the position of which is therefore an index of the hot spot temperature of the main transformer. The lever 12 may be made to actuate any suitable device, such as a switch 13, for operating an alarm for tripping a circuit breaker and it will be seen that the presence of the switch 13 makes the system 4 a thermal relay as well as a temperature indicator.

For compensating the system 4 for changes in ambient temperature the spring 11 is connected to the arm 12 by way of an ambient temperature compensator 14 and a lever 15. The temperature compensator is a second bellows which is filled with a liquid, such as turpentine. Such a device, while being extremely compact and rigid, has a relatively small linear expansion over the range of outdoor ambient temperatures. Therefore, if the biasing spring were compressed directly by the compensating bellows, the spring would have to have an extremely high gradient or stiffness and, in fact, it would be difficult, if not impossible, to make a conventional spring having a sufficiently high gradient or stiffness. In order to overcome this we arrange the spring 11 and the compensator 14 relative to the lever 15 in such a way that the compensator has a substantial mechanical disadvantage relative to the spring 11. In other words, the lever mutiplies the motion of the bellows 14 so that a conventional biasing spring having an ordinary gradient may be employed.

The operation of the invention is as follows: Changes in vapor pressure in the bulb 8 due to the combined effect of the temperature of the liquid 2 and the current in the heater 9 cause the bellows 10 to move the arm 12 against the biasing or opposing action of the spring 11. The system is ordinarily adjusted so that there is no movement until the pressure rises to a value corresponding to the maximum permissible hot spot winding temperature of the main transformer at which critical pressure the biasing force of the spring 11 will be overcome and the arm 12 will move so as to actuate the switch 13.

A decrease in ambient temperature will cause contraction of the compensating bellows 14, thus permitting some expansion of the spring 11 so that the latter will exert a smaller biasing force against the main bellows 10, with the result that the switch 13 will be actuated at a lower hot spot temperature. Conversely, if the ambient temperature increases, the thermal setting of the system is increased.

While there has been shown and described a particular embodiment of this invention, it will be obvious to those skilled in the art that various changes and modifications can be made therein without departing from the invention and, therefore, it is aimed in the appended claim to cover all such changes and modifications as fall within the true spirit and scope of the invention.

What we claim as new and desire to secure by Letters Patent of the United States is:

In combination, encased electric apparatus, a bulb inside said apparatus, a bellows outside said apparatus, a capillary tube interconnecting the lower portion of said bulb and said bellows and together therewith forming a hermetically sealed system, said system being entirely filled with a liquid except for the upper portion of said bulb which is filled with the vapor of said liquid, a rigid lever pivotally mounted at one end adjacent said bellows, said bellows being arranged to apply an actuating force to said lever between its ends, an electric switch operable by a predetermined motion at the other end of said lever, a second rigid lever pivotally mounted at one end, an hermetically sealed ambient temperature compensating liquid filled bellows interposed between intermediate points on both levers so that opposite sides of said compensating bellows make mechanical contact respectively with said points, and a main biasing spring connected between the free end of the second lever and a rigid support which is independent of the first lever.

GUGLIELMO CAMILLI.
JEAN PENVENNE.

REFERENCES CITED

The following references are of record in the file of this patent:

UNITED STATES PATENTS

| Number | Name | Date |
| --- | --- | --- |
| 1,439,750 | Nelson | Dec. 26, 1922 |
| 1,988,776 | Berghoefer | Jan. 22, 1935 |
| 2,133,361 | Reeves | Oct. 18, 1938 |
| 1,593,170 | Giesler | July 20, 1926 |

FOREIGN PATENTS

| Number | Country | Date |
| --- | --- | --- |
| 791,251 | France | Sept. 23, 1935 |